United States Patent
Lee et al.

(10) Patent No.: US 9,438,065 B2
(45) Date of Patent: Sep. 6, 2016

(54) PORTABLE ELECTRONIC DEVICE, WIRELESS CHARGING DEVICE FOR THE SAME, AND WIRELESS CHARGING SYSTEM

(71) Applicant: SNU R&DB FOUNDATION, Seoul (KR)

(72) Inventors: Jung Woo Lee, Seoul (KR); Sung Su Lee, Yongin-si (KR)

(73) Assignee: SNU R&DB FOUNDATION, Seoul (KR)

( * ) Notice: Subject to any disclaimer, the term of this patent is extended or adjusted under 35 U.S.C. 154(b) by 126 days.

(21) Appl. No.: 14/220,259

(22) Filed: Mar. 20, 2014

(65) Prior Publication Data

US 2015/0200561 A1    Jul. 16, 2015

(30) Foreign Application Priority Data

Jan. 16, 2014  (KR) .................. 10-2014-0005531

(51) Int. Cl.
*H02J 7/02*    (2016.01)
*H02J 7/00*    (2006.01)

(52) U.S. Cl.
CPC .............. *H02J 7/025* (2013.01); *H02J 7/0042* (2013.01); *H02J 7/0052* (2013.01); *H02J 2007/0096* (2013.01)

(58) Field of Classification Search
CPC ...... H02J 7/025; H02J 7/0042; H02J 7/0052; H02J 2007/0096
USPC ........................................................ 320/108
See application file for complete search history.

(56) References Cited

U.S. PATENT DOCUMENTS

| | | | | |
|---|---|---|---|---|
| 8,890,470 B2 * | 11/2014 | Partovi | ................. | H01F 7/0252 320/108 |
| 8,901,881 B2 * | 12/2014 | Partovi | ................. | H01F 7/0252 320/108 |
| 8,903,456 B2 * | 12/2014 | Chu | ..................... | H04M 19/04 320/106 |
| 2011/0050164 A1 * | 3/2011 | Partovi | ................... | H01F 5/003 320/108 |
| 2012/0146576 A1 * | 6/2012 | Partovi | ................. | H01F 7/0252 320/108 |
| 2013/0260677 A1 * | 10/2013 | Partovi | .................... | H01F 5/003 455/41.1 |
| 2015/0002088 A1 * | 1/2015 | D'Agostino | ............ | H02J 7/025 320/108 |
| 2015/0028802 A1 * | 1/2015 | Lee | ......................... | H02J 7/025 320/108 |
| 2015/0162767 A1 * | 6/2015 | Oh | ........................ | H02J 7/0044 320/108 |

* cited by examiner

Primary Examiner — Sun Lin
(74) Attorney, Agent, or Firm — William Park & Associates Ltd.

(57) ABSTRACT

A wireless charging device may include: a transmitting unit configured to receive a high-frequency AC current and generate magnetic energy; and a first fixing unit disposed on a rear surface of the transmitting unit and configured to generate a designated magnitude or more of attractive force.

22 Claims, 6 Drawing Sheets

FIG.7
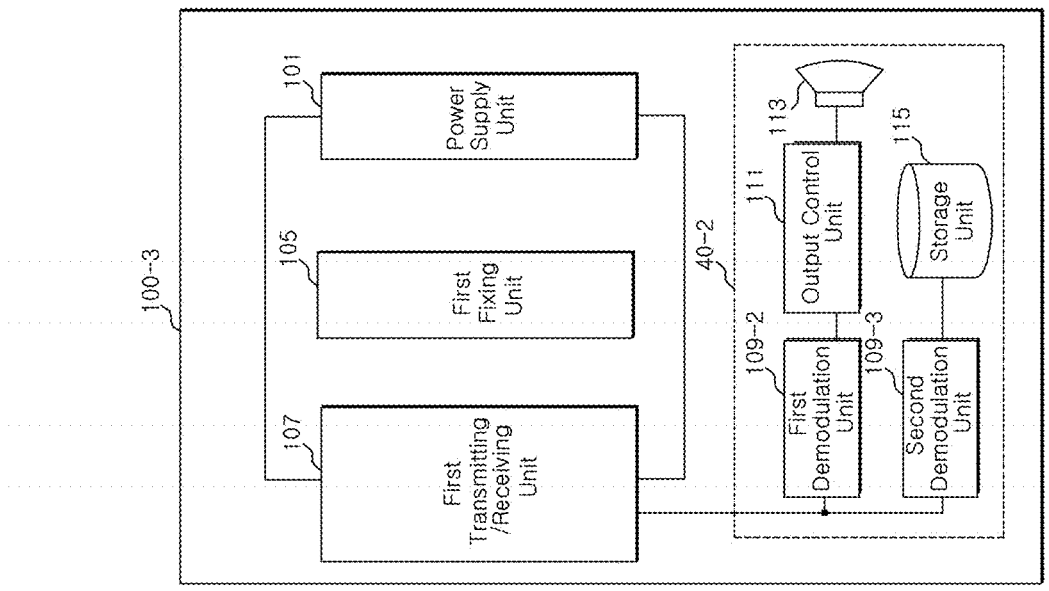
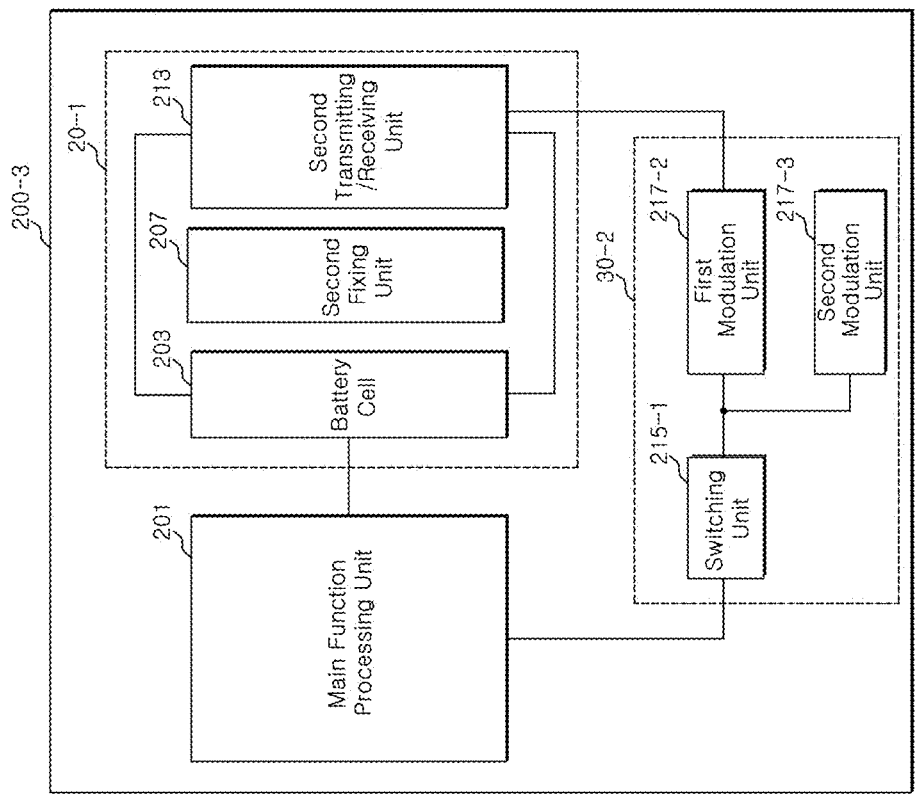

PORTABLE ELECTRONIC DEVICE, WIRELESS CHARGING DEVICE FOR THE SAME, AND WIRELESS CHARGING SYSTEM

CROSS-REFERENCES TO RELATED APPLICATION

The present application claims priority under 35 U.S.C. §119(a) to Korean application number 10-2014-0005531, filed on Jan. 16, 2014, in the Korean Intellectual Property Office, which is incorporated herein by reference in its entirety.

BACKGROUND

1. Technical Field

Various embodiments relate to a wireless electronic device, and more particularly, to a portable electronic device, a wireless charging device for the same, and a wireless charging system.

2. Related Art

Portable electronic devices may provide various services such as voice communication service, text transmission and reception service, multimedia service, communication service, and electronic document service, without having time and space restraints.

The functions of the portable electronic devices have developed day by day. Recently, a variety of smart phones and smart pads, referred to as smart devices, have spread.

With the increase in number of services which can be used through portable electronic devices, users are enjoying a more convenient life. However, the number and complexity of operations to be processed by the portable electronic devices have significantly increased. Thus, the battery consumption of the portable electronic devices is inevitably increased.

In general, a portable electronic device is charged in a wired manner. That is, the portable electronic device and a power supply terminal may be coupled through a cable to charge the portable electronic device. In this case, however, a user must carry a charging cable, and cannot charge the portable electronic device when the user has no charging cable or power supply terminal to connect the charging cable at a necessary time.

Recently, a technique for charging a portable electronic device in a wireless manner has been developed.

Representative examples of the wireless charging method may include a magnetic induction method, a magnetic resonance method, an electromagnetic wave method and the like. The magnetic induction method transmits a current induced in a primary coil of a wireless charging device to a secondary coil of a portable electronic device, and provides a distance range of 0.5 to 1 cm. The magnetic resonance method has an advantage in that it provides a long distance range of 2 to 3 m, but requires an impact assessment for the human body because it uses electromagnetic waves of several MHz. The electromagnetic wave method provides a distance range of several tens km, but also requires an impact assessment for the human body.

Currently, wireless charging devices based on the magnetic induction method are manufactured to satisfy the WPC (Wireless Power Consortium) or PMA (Power Matters Alliance) standard.

The wireless charging system based on the magnetic induction method uses the principle that, when a portable electronic device is placed close to a charging pad of the wireless charging device including a primary coil to generate an electromagnetic field, a power receiver (secondary coil) of the portable electronic device receives magnetic energy according to electromagnetic induction, and charges a battery of the portable electronic device.

Thus, the charging pad must be manufactured in a flat type such that the portable electronic device is maintained within a distance of 0.5 to 1 cm from the charging pad of the wireless charging device, or may require an additional device through which the portable electronic device is attached to/from the wireless charging device. In particular, when the portable electronic device needs to be charged while moved on a vehicle in operation, a reliable fixing and separating device may be required to prevent the portable electronic device from coming off.

SUMMARY

In an embodiment of the present disclosure, a wireless charging device may include: a transmitting unit configured to receive a high-frequency AC current and generate magnetic energy; and a first fixing unit disposed on a rear surface of the transmitting unit and configured to generate a designated magnitude or more of attractive force.

In an embodiment of the present disclosure, a portable electronic device may include: a battery cell; a receiving unit configured to receive magnetic energy and provide the received magnetic energy to the battery cell; and a second fixing unit disposed on a rear surface of the receiving unit.

In an embodiment of the present disclosure, a wireless charging system may include: a wirelessly charging device configured to generate magnetic energy and a designated magnitude or more of attractive force; and a portable electronic device attached to the wireless charging device through an attractive force and charged with power through the magnetic energy provided from the wireless charging device.

BRIEF DESCRIPTION OF THE DRAWINGS

Features, aspects, and embodiments are described in conjunction with the attached drawings, in which:

FIG. 7 is a configuration diagram of a wireless charging system according to another embodiment of the present disclosure.

DETAILED DESCRIPTION

Hereinafter, a portable electronic device, a wireless charging device for the same, and a wireless charging system according to the present disclosure will be described below with reference to the accompanying drawings through exemplary embodiments.

Figure 1:
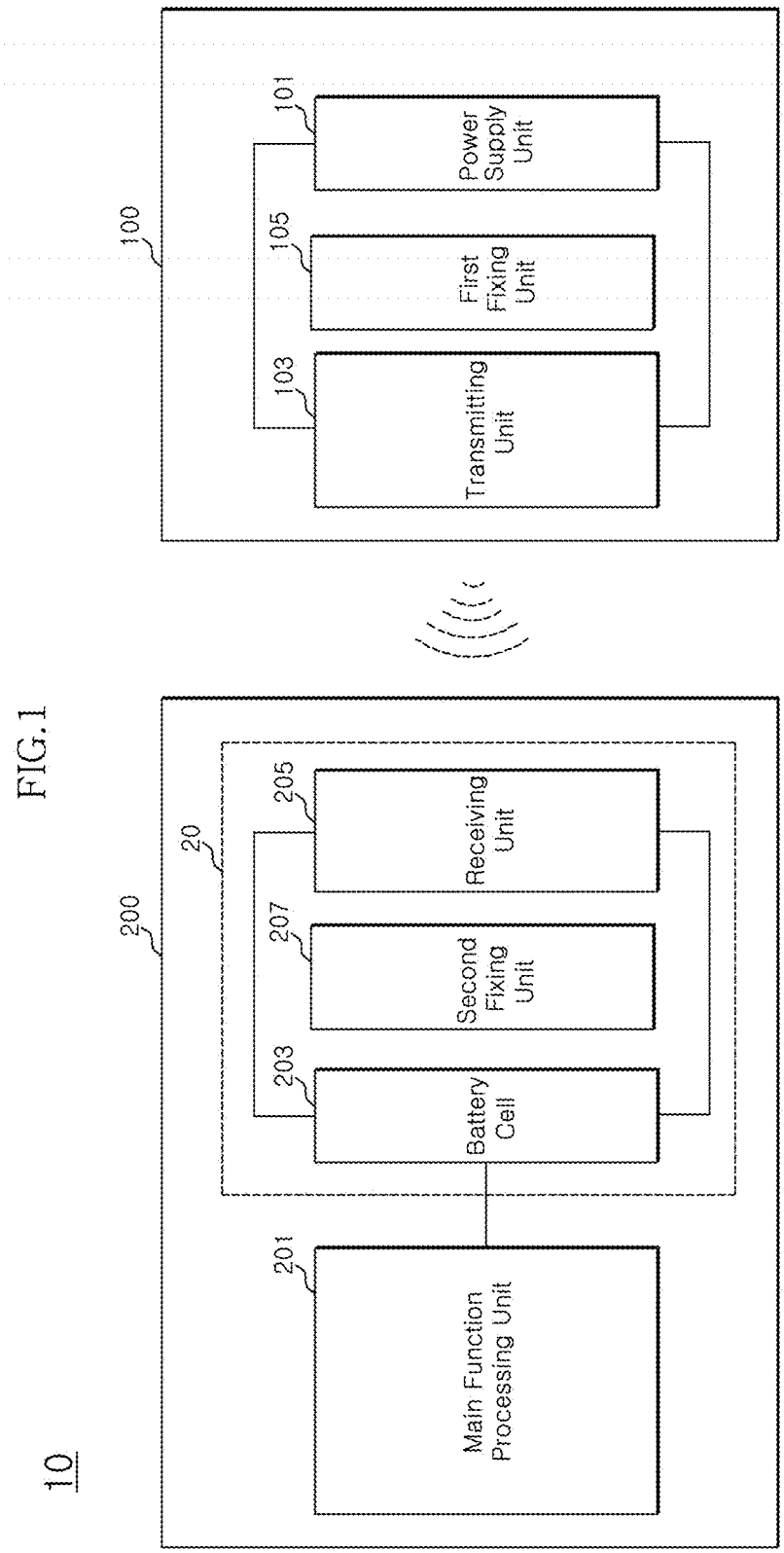
FIG. 1 is a configuration diagram of a wireless charging system according to an embodiment of the present disclosure.

FIG. 1 is a configuration diagram of a wireless charging system according to an embodiment of the present disclosure.

Referring to FIG. 1, the wireless charging system 10 according to the embodiment of the present disclosure may include a wireless charging device 100 and a portable electronic device 200. The wireless charging device 100 may generate magnetic energy, for example, AC magnetic fields, and the portable electronic device 200 may be attached to the wireless charging device 100 through an attractive force and charged with power through the magnetic energy provided from the wireless charging device 100.

The wireless charging device 100 may include a power supply unit 101, a transmitting unit 103, and a first fixing unit 105.

The power supply unit 101 may receive normal AC power and output a high-frequency AC current, and the transmitting unit 103 may receive a high-frequency AC current and generate magnetic energy, for example, AC magnetic fields. The transmitting unit 103 may include a primary coil, for example.

The first fixing unit 105 may be disposed on the rear surface of the transmitting unit 103, and generate a designated magnitude or more of attractive force. That is, when a charging pad is formed outside one surface of a housing of the wireless charging device 100, the transmitting unit 103 may be installed on the inner rear surface of the housing so as to face the charging pad with the housing provided therebetween. The first fixing unit 105 may be formed on the rear surface of the transmitting unit 103 formed on the rear surface of the housing. The first fixing unit 105 may include a neodymium-based permanent magnet or electromagnetic magnet, but is not limited thereto. Furthermore, the first fixing unit 105 may be formed in a similar shape to the charging pad, for example, a flat shape, and have a thickness of 0.5 to 1.5 cm.

The portable electronic device 200 may include a main function processing unit 201 and a battery device 20 to provide power to the main function processing unit 201. The battery device 20 may include a battery cell 203, a receiving unit 205, and a second fixing unit 207.

The main function processing unit 201 may process main functions according to the manufacturing purpose of the portable electronic device 200. When the portable electronic device 200 is a wireless communication device, for example, the main function processing unit 201 may include components required for wireless communication. When the portable electronic device 200 is a multimedia player, for example, the main function processing unit 201 may include components required for playing multimedia. That is, the main function processing unit 201 may be configured to process various service applications provided through the portable electronic device 200.

The battery cell 203 may store electric energy and provide the stored electric energy to the main function processing unit 201. The receiving unit 205 may receive magnetic energy provided from the transmitting unit 103 of the wireless charging device 100, and provide an induced current generated from the received magnetic energy to the battery cell 203. The receiving unit 205 may include a secondary coil, for example.

The second fixing unit 207 may be installed on the rear surface of the receiving unit 205. That is, when the receiving unit 205 is disposed on one rear surface of the housing of the portable electronic device 200, the second fixing unit 207 may be formed on the rear surface of the receiving unit 205 formed on the rear surface of the housing. The second fixing unit 207 may include a neodymium-based permanent magnet or steel plate, but is not limited thereto. Furthermore, the second fixing unit 207 may be manufactured in a thin film type in consideration of the thickness of the portable electronic device 200.

Thus, when the surface at which the receiving unit 205 of the portable electronic device 200 is formed is placed close to the charging pad of the wireless charging device 100 in the wireless charging system 10 according to the embodiment of the present disclosure, an attractive force may be generated between the wireless charging device 100 and the portable electronic device 200. Then, a charging operation may be performed in a state where two devices are attached to each other.

Figure 2:
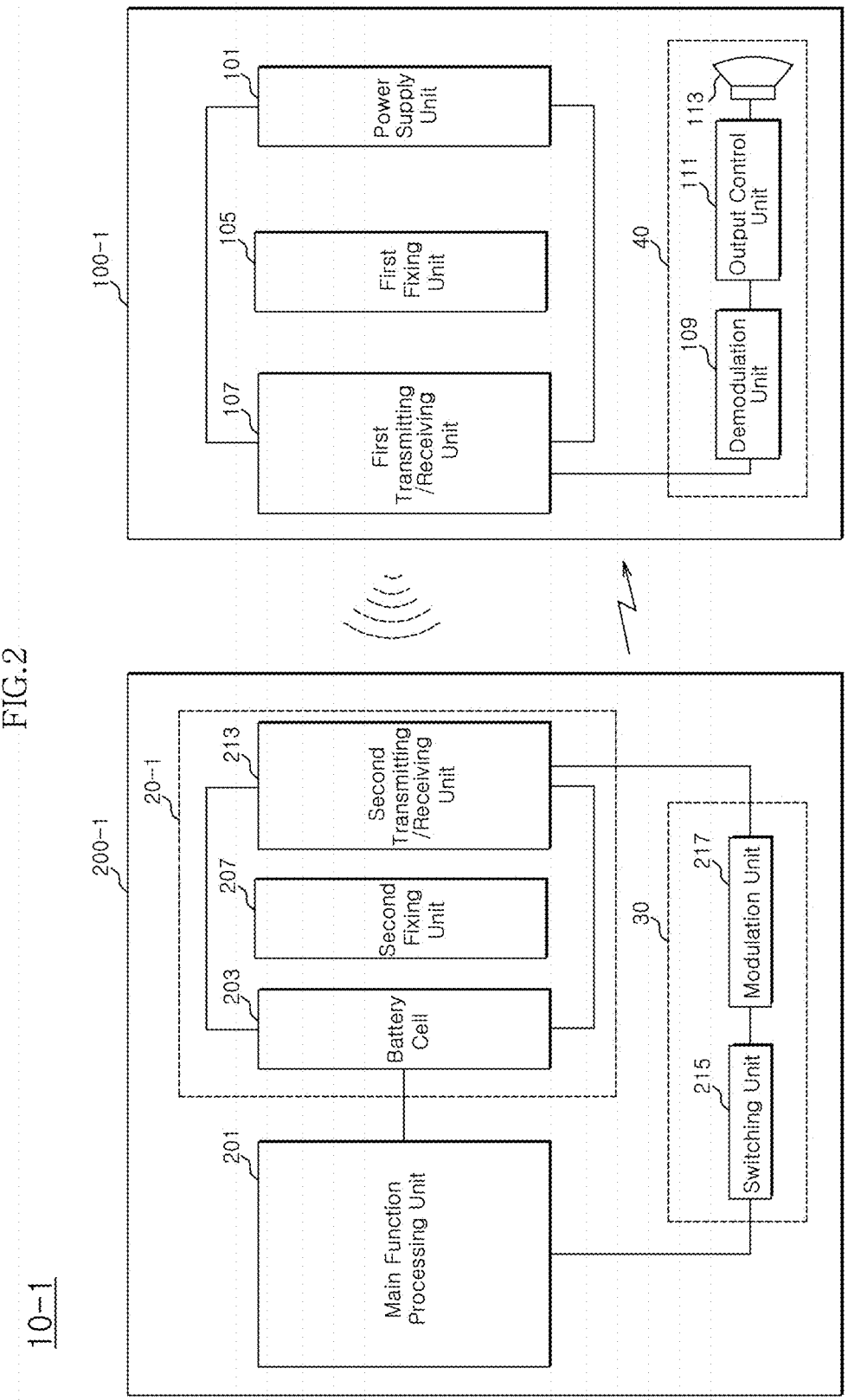
FIG. 2 is a configuration diagram of a wireless charging system according to another embodiment of the present disclosure.

FIG. 2 is a configuration diagram of a wireless charging system according to another embodiment of the present disclosure.

The wireless charging system 10-1 according to the embodiment of the present disclosure may include a wireless charging device 100-1 and a portable electronic device 200-1. The wireless charging device 100-1 may generate magnetic energy, and output multimedia data provided from the portable electronic device 200-1, and the portable electronic device 200-1 may be attached to the wireless charging device 100-1 through an attractive force and charged with power through the magnetic energy provided from the wireless charging device 100-1, and provide multimedia data to the wireless charging device 100-1.

The wireless charging device 100-1 may include a power supply unit 101, a first transmitting/receiving unit 107, a first fixing unit 105, and a reproducing unit 40 serving as a data processing unit.

The power supply unit 101 may receive normal AC power, and output a high-frequency AC current.

The first transmitting/receiving unit 107 may receive the high-frequency AC current from the power supply unit 101 and generate magnetic energy. Furthermore, the first transmitting/receiving unit 107 may receive multimedia data from the portable electronic device 200-1 and provide the received multimedia data to the reproducing unit 40. The first transmitting/receiving unit 107 may include a primary coil, for example.

The first fixing unit 105 may be disposed on the rear surface of the first transmitting/receiving unit 107, and generate a designated magnitude or more of attractive force. That is, when a charging pad is formed outside one surface (front surface) of a housing of the wireless charging device 100-1, the first transmitting/receiving unit 107 may be installed on an inner rear surface of the housing so as to face the charging pad with the housing provided therebetween. The first fixing unit 105 may be formed on the rear surface of the first transmitting/receiving unit 107 formed on the rear surface of the housing. The first fixing unit 105 may include a neodymium-based permanent magnet or electromagnetic magnet, but is not limited thereto. Furthermore, the first fixing unit 105 may be formed in a similar shape to the charging pad, for example, a flat shape and have a thickness of 0.5 to 1.5 cm.

The reproducing unit 40 may serve as a data processing unit, and include a demodulation unit 109, an output control unit 111, and an output unit 113. The demodulation unit 109 may receive modulated multimedia data from the portable electronic device 200-1 through the first transmitting/receiving unit 107, and demodulate the received multimedia data. The output control unit 111 may output the demodulated multimedia data through the output unit 113.

The portable electronic device 200-1 may include a main function processing unit 201, a battery device 20-1, and a transmitting unit 30. The battery device 20-1 may provide power to the main function processing unit 201. The transmitting unit 30 may be included in the main function processing unit 201. The battery device 20-1 may include a battery cell 203, a second transmitting/receiving unit 213, and a second fixing unit 207.

The main function processing unit 201 may process main functions according to the manufacturing purpose of the portable electronic device 200, that is, various service applications provided through the portable electronic device 200.

The battery cell 203 may store electric energy and provide the stored electric energy to the main function processing unit 201.

The second transmitting/receiving unit 213 may receive magnetic energy from the first transmitting/receiving unit 107 of the wireless charging device 100 and provide the received energy to the battery cell 203. Furthermore, the second transmitting/receiving unit 213 may transmit multimedia data provided from the transmitting unit 30 to the wireless charging device 100-1. The second transmitting/receiving unit 213 may include a secondary coil, for example.

The second fixing unit 207 may be installed on the rear surface of the second transmitting/receiving unit 213. That is, when the second transmitting/receiving unit 213 is disposed on one rear surface of a housing of the portable electronic device 200-1, the second fixing unit 207 may be formed on the rear surface of the second transmitting/receiving unit 213 formed on the rear surface of the housing. The second fixing unit 207 may include a neodymium-based permanent magnet or steel plate, but is not limited thereto. Furthermore, the second fixing unit 207 may be manufactured in a thin film type in consideration of the thickness of the portable electronic device 200-1.

The transmitting unit 30 may serve to change a data transmission path within the portable electronic device 200-1, and include a switching unit 215 and a modulation unit 217. The switching unit 215 may change an output path of multimedia data which may be reproduced in the portable electronic device 200-1, according to a user's request. As the output path is changed through the switching unit 215, the modulation unit 217 may receive multimedia data through the switching unit 215, modulate the received multimedia data, and transmit the modulated multimedia data to the wireless charging device 100-1 through the second transmitting unit 213.

That is, in the present embodiment, the modulation unit 217 using a carrier frequency in a different band from a carrier frequency for wireless power, transmitted to the portable electronic device 200-1 from the wireless charging device 100-1, may modulate multimedia data. Thus, the modulated multimedia data may be transmitted to the wireless charging device 100-1 without interfering with a wireless power signal, and the demodulation unit 109 of the wireless charging device 100-1 may demodulate the multimedia data into original data.

Thus, when the surface at which the second transmitting/receiving unit 213 of the portable electronic device 200-1 is formed is placed close to the charging pad of the wireless charging device 100-1 in the wireless charging system 10-1 according to the embodiment of the present disclosure, an attractive force may be generated between the wireless charging device 100-1 and the portable electronic device 200-1. Then, a charging operation may be performed in a state where the two devices are attached to each other.

Furthermore, according to a user's request, multimedia data which may be reproduced through the portable electronic device 200-1, for example, music/voice data may be transmitted to the wireless charging device 100-1, and outputted through the reproducing unit 40.

Figure 3:
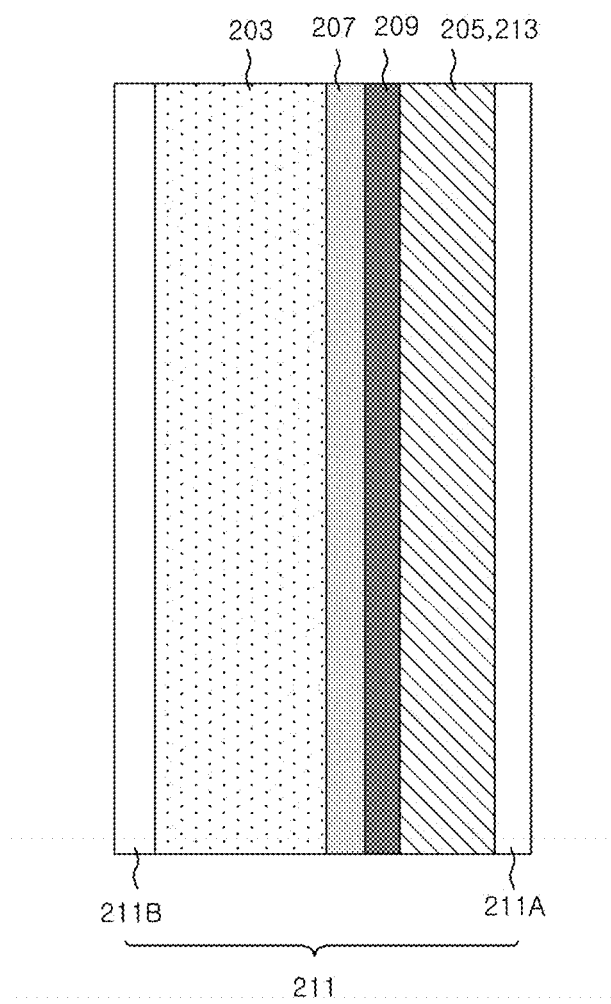
FIG. 3 is a diagram illustrating a battery device of FIG. 1 or 2.

FIG. 3 is a diagram illustrating the battery device of FIG. 1 or 2.

Referring to FIG. 3, the battery device 20 or 20-1 may include the receiving unit 205 or second transmitting/receiving unit 213, the second fixing unit 207 formed on the rear surface of the receiving unit 205 or second transmitting/receiving unit 213, and the battery cell 203 formed on the rear surface of the second fixing unit 207. The battery device 20 or 20-1 may further include a shielding layer 209 between the receiving unit 205 and the fixing unit 207 or between the second transmitting/receiving unit 213 and the second fixing unit 207. The battery device 20 or 20-1 may be packaged by a case 211 (211A and 211B).

The receiving unit 205 or the second transmitting/receiving unit 213 may be formed on the rear surface of the rear case 211B, and the shielding layer 209, the second fixing unit 207, and the battery cell 203 may be sequentially formed on the rear surface of the receiving unit 205 or the second transmitting/receiving unit 213.

When the shielding layer 209 is formed, electromagnetic fields generated during a charging operation for the portable electronic device 200 or 200-1 may be prevented from influencing the radio sensitivity of the portable electronic device 200 or 200-1. The shielding layer 209 may be formed of a ferrite material, but is not limited thereto. The shielding layer 209 may have an attractive force with respect to the first fixing unit 105 of the wireless charging device 100 or 100-1. However, it is impossible to expect such a large force as to fix the portable electronic device 200 or 200-1. Instead, the second fixing unit 207 may be formed on the rear surface of the shielding layer 209 so as to secure a sufficient attractive force for fixing the portable electronic device 200 or 200-1.

Figure 4:
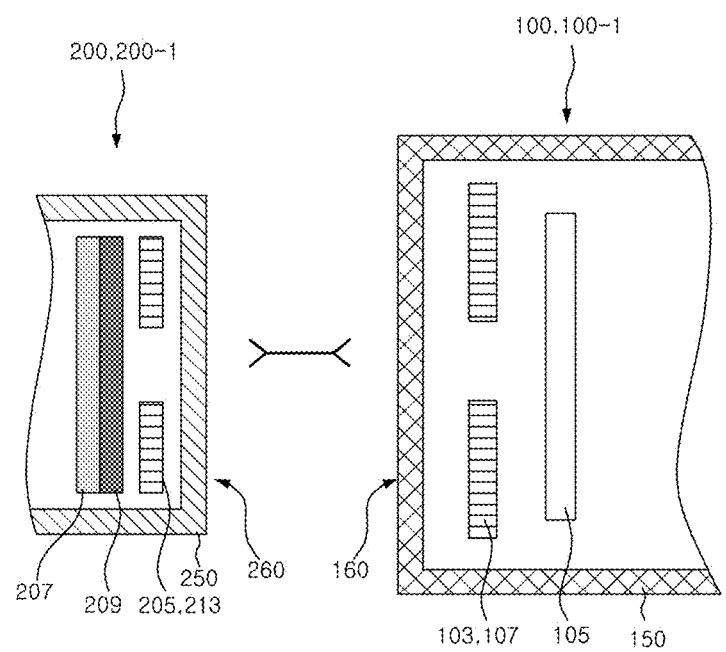
FIG. 4 is a diagram for explaining the principle that a wireless charging device and a portable electronic device are attached to each other.

FIG. 4 is a diagram for explaining the principle that the wireless charging device and the portable electronic device are attached to each other.

Referring to FIG. 4, one outer surface of the housing 150 of the wireless charging device 100 or 100-1 may serve as the charging pad 160. The transmitting unit 103 or the first transmitting/receiving unit 107 may be disposed on the inner rear surface of the housing 105, with the housing 150 provided between the transmitting unit 103 or the first transmitting/receiving unit 107 and the surface serving as the charging pad 160. Furthermore, the first fixing unit 105 may be disposed on the rear surface of the transmitting unit 103 or the first transmitting/receiving unit 107.

The receiving unit 205 or the second transmitting/receiving unit 213 may be disposed within one surface 260 of the housing 250 of the portable electronic device 200 or 200-1. Furthermore, the shielding layer 209 and the second fixing unit 207 may be disposed on the rear surface of the receiving unit 205 or the second transmitting/receiving unit 213.

Thus, when the portable electronic device 200 or 200-1 is placed close to the wireless charging device 100 or 100-1, the surface 260 of the housing 250 of the portable electronic device 200 or 200-1 may be attached to the charging pad 160 through an attractive force generated between the first fixing unit 105 and the second fixing unit 207. Then, the wireless charging device 100 or 100-1 may transmit power to the portable electronic device 200 or 200-1 so as to charge the portable electronic device 200 or 200-1.

In such a state, when a user wants to play multimedia through the wireless charging device 100-1, multimedia data of the portable electronic device 200-1 may be transmitted to the first transmitting/receiving unit 107 through the second transmitting/receiving unit 213 and then outputted.

The wireless charging device 100 or 100-1 according to the embodiment of the present disclosure may be used as a stand serving as a charging device for a vehicle, and may be implemented in a desk-top or wall-top type for house or office. In particular, the wireless charging device 100-1 having a multimedia output function may output music/voice data of the portable electronic device 200-1 or music/voice data of a navigation system. Thus, multimedia data may be reproduced more efficiently.

Furthermore, the wireless charging device 100 or 100-1 may serve as a multi-functional stand which may reproduce multimedia data while charging the portable electronic device 200-1.

So far, it has been described that the transmitting unit 103 of the wireless charging device 100 and the first transmitting/receiving unit 107 of the wireless charging device 100-1 have different configurations. The transmitting unit 103 and the first transmitting unit 107 may have the same configuration, and may be formed with a coil, for example. Furthermore, the receiving unit 205 of the portable electronic device 200 and the second transmitting/receiving unit 213 of the portable electronic device 200-1 may be formed to have the same configuration, using a coil. In other words, the transmitting unit 103 and the first transmitting/receiving unit 107 may have substantially the same configuration, and the receiving unit 205 and the second transmitting/receiving unit 213 may have substantially the same configuration.

Figure 5:
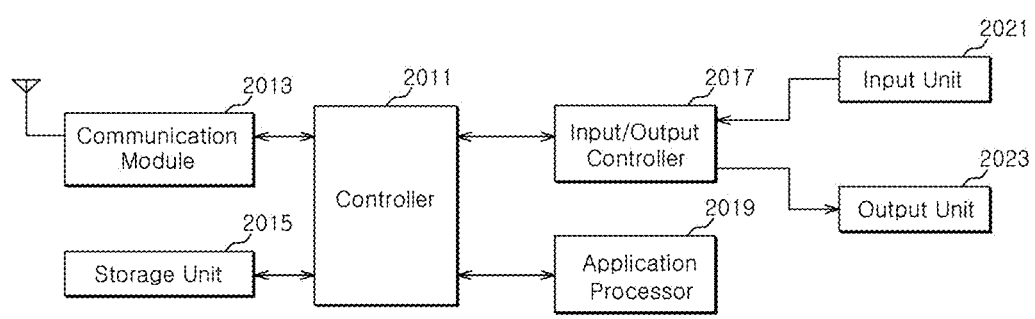
FIG. 5 is a diagram illustrating a main function processing unit of FIG. 1 or 2.

FIG. 5 is a diagram illustrating the main function processing unit of FIG. 1 or 2.

Referring to FIG. 5, the main function processing unit 201 may include a controller 2011, a communication module 2013, a storage unit 2015, an input/output controller 2017, and an application processor 2019.

The controller 2011 may control overall operations of the portable electronic device 200 or 200-1.

The main function processing unit 201 may include one or more communication modules 2013, for example, one or more of a communication module for voice communication, a communication module for data communication, a communication module for voice/data communication, and a near-field communication module.

The storage unit 2015 may include a main memory device and an auxiliary memory device. The main memory device may store programs, control signals, and data required for the operation of the controller 2011, and the auxiliary memory device may store external programs or data.

The input/output control unit 2017 may receive a user command through an input unit 2021 and provide the received user command to the controller 2011. Furthermore, the input/output control unit 2017 may receive an operation state, event, or data processing result of the portable electronic device 200 or 200-1 and output the received data to the output unit 2023.

The application processing unit 2019 may execute the programs or applications stored in the storage unit 2015, or particularly, the auxiliary memory device, and process control signals and data.

FIG. 5 illustrates a case in which the main function processing unit 201 of the portable electronic device 200 or 200-1 includes the communication module 2013. However, the portable electronic device is not limited to a communication device, but may be applied to any wireless electronic devices as long as they are operated by power stored in a battery cell.

Figure 6:
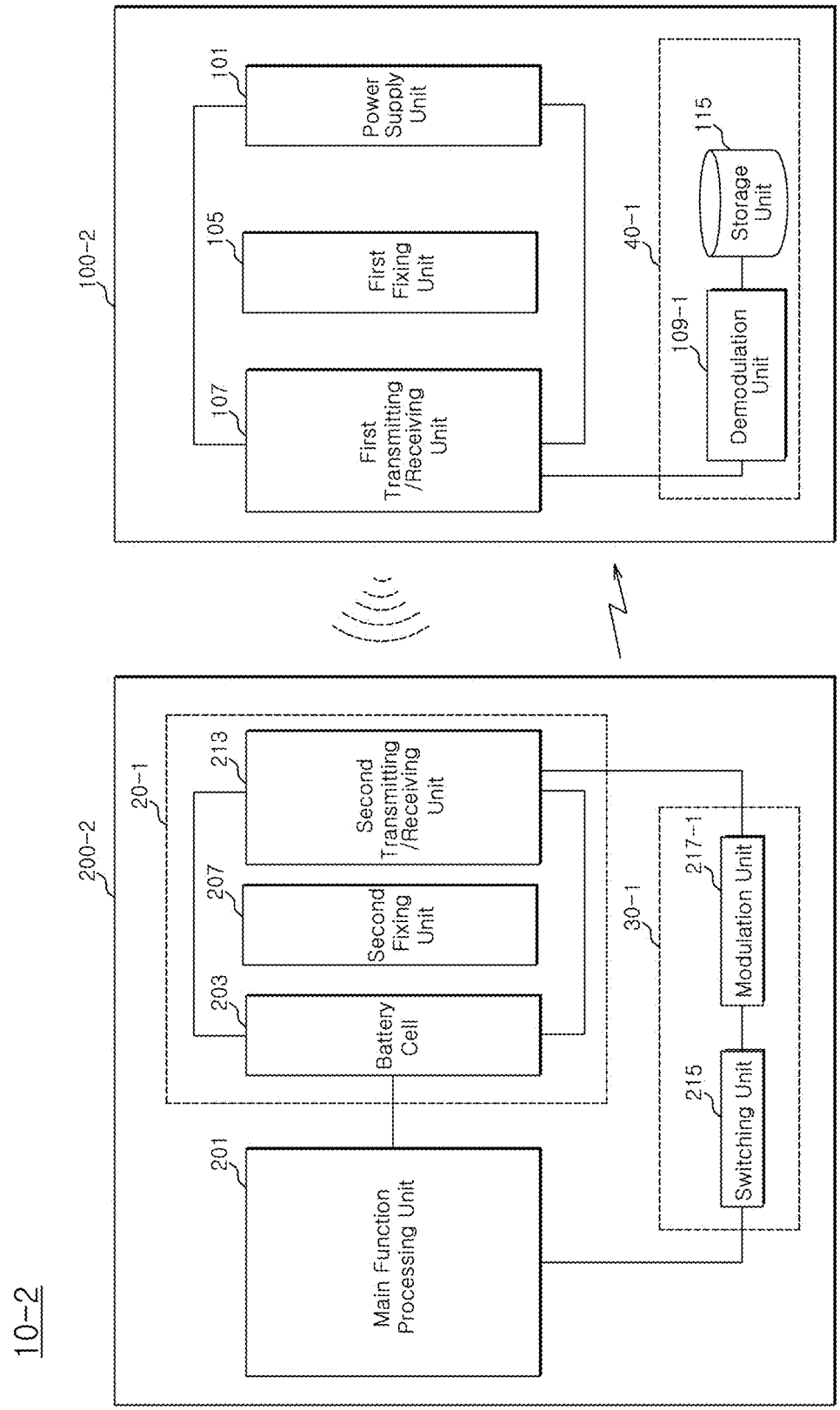
FIG. 6 is a configuration diagram of a wireless charging system according to another embodiment of the present disclosure.

FIG. 6 is a configuration diagram of a wireless charging system according to another embodiment of the present disclosure.

The wireless charging system 10-2 according to the embodiment of the present disclosure may include a wireless charging device 100-2 and a portable electronic device 200-2. The wireless charging device 100-2 may generate magnetic energy and store data which are wirelessly provided from the portable electronic device 200-2, and the portable electronic device 200-2 may be attached to the wireless charging device 100-2 through an attractive force and charged with power through the magnetic energy provided from the wireless charging device 100-2, and wirelessly transmit data to the wireless charging device 100-2.

The wireless charging device 100-2 may include a power supply unit 101, a first transmitting/receiving unit 107, a first fixing unit 105, and a backup unit 40-1. The respective units excluding the backup unit 40-1 may perform substantially the same functions as those illustrated in FIG. 2.

The backup unit 40-1 serving as a data processing unit may include a modulation unit 109-1 and a storage unit 115. The demodulation unit 109-1 may receive modulated data from the portable electronic device 200-2 through the first transmitting/receiving unit 107 and demodulate the received data. The storage unit 115 may serve to store the demodulated data, and include a semiconductor disk drive (SDD) or hard disk drive (HDD), for example. Furthermore, the storage unit 115 may be embedded in the wireless charging device 100-2 or separately provided outside the wireless charging device 100-2.

The portable electronic device 200-2 may include a main function processing unit 201, a battery device 20-1, and a data transmitting unit 30-1. The respective units excluding the data transmitting unit 30-1 may perform substantially the same functions as those described with reference to FIG. 2, and the data transmitting unit 30-1 may be included in the main function processing unit 201.

The data transmitting unit 30-1 may include a switching unit 215 and a modulation unit 217-1. The switching unit 215 may change a transmission path of data stored in the portable electronic device 200-1 or data to be stored in the portable electronic device 200-1, according to a user's request. As the switching unit 215 changes the transmission path, the modulation unit 217-1 may receive data through the switching unit 215, modulate the received data, and transmit the modulated data to the wireless charging device 100-2 through the second transmitting/receiving unit 213.

In the present embodiment, the portable electronic device 200-2 may have a video recording function, and include a black box device, for example. Thus, video data recorded through the portable electronic device 200-2 may be transmitted to the wireless charging device 100-2 through the data transmitting unit 30-1, and the transmitted video data may be stored in the storage unit 115 of the wireless charging device 100-2.

According to the present embodiment, while the portable electronic device 200-2 having a video recording function is charged in a state where it is attached to the wireless charging device 100-2, video data stored in the portable electronic device 200-2 or video data to be stored in the portable electronic device 200-2 may be backed up and stored in the wireless charging device 100-2.

FIG. 7 is a configuration diagram of a wireless charging system according to another embodiment of the present disclosure.

The wireless charging system 10-3 illustrated in FIG. 7 may include a wireless charging device 100-3 and a portable electronic device 200-3. The wireless charging device 100-3 may generate magnetic energy, and store multimedia data and video data which are wirelessly provided from the portable electronic device 200-3, and the portable electronic device 200-3 may be attached to the wireless charging device 100-3 through an attractive force and charged with power through the magnetic energy provided from the wireless charging device 100-3, and wirelessly transmit multimedia data and video data to the wireless charging device 100-3.

The power supply unit 101, the first fixing unit 105, and the first transmitting/receiving unit 107 of the wireless charging device 100-3 may have substantially the same functions as those described with reference to FIG. 2 or 6.

A reproducing and backup unit 40-2 serving as a data processing unit may include a first demodulation unit 109-2, a second demodulation unit 109-3, an output control unit 111, an output unit 113, and a storage unit 115.

The first demodulation unit 109-2 may demodulate modulated multimedia data transmitted from the portable electronic device 200-3, and the output control unit 111 may output the demodulated data through the output unit 113.

The second demodulation unit 109-3 may demodulate modulated multimedia data transmitted from the portable electronic device 200-3, and the storage unit 115 may serve as a medium to store the demodulated data and include an SDD or HDD, for example. The storage unit 115 may be embedded in the wireless charging device 100-2 or separately provided outside the wireless charging device 100-2.

The portable electronic device 200-3 may include a main function processing unit 201, a battery device 20-1, and a transmitting unit 30-2, and the main function processing unit 201 and the battery device 20-1 may perform substantially the same functions as those illustrated in FIGS. 2 and 6. The transmitting unit 30-2 may be included in the main function processing unit 201.

The transmitting unit 30-2 may include a switching unit 215-1, a first modulation unit 217-2, and a second modulation unit 217-3.

The switching unit 215-1 may change an output path of multimedia data which may be reproduced through the portable electronic device 200-3 or change a transmission path of data stored in the portable electronic device 200-3 or data to be stored in the portable electronic device 200-3, according to a user's request. The first modulation unit 217-2 may receive the multimedia data provided through the switching unit 215-1, modulate the received multimedia data, and transmit the modulated data to the wireless charging device 100-3 through the second transmitting/receiving unit 213. The second modulation unit 217-3 may receive video data provided through the switching unit 215-1, modulate the received video data, and transmit the modulated data to the wireless charging device 100-3 through the second transmitting/receiving unit 213.

According to the wireless charging system 10-3, the charging operation may be performed in a state where the portable electronic device 200-3 and the wireless charging device 100-3 are attached to each other. Furthermore, multimedia data to be reproduced through the portable electronic device 200-3 may be wirelessly transmitted to the wireless charging device 100-3 and then outputted, or video data stored in the portable electronic device 200-3 or video data to be stored in the portable electronic device 200-3 may be backed up into the storage unit 115 of the wireless charging device 100-3.

While certain embodiments have been described above, it will be understood to those skilled in the art that the embodiments to described are by way of example only. Accordingly, the device described herein should not be limited based on the described embodiments. Rather, the device described herein should only be limited in light of the claims that follow when taken in conjunction with the above description and accompanying drawings.

What is claimed is:

1. A portable electronic device comprising:
   a battery cell;
   a receiving unit configured to receive magnetic energy and provide the received magnetic energy to the battery cell;
   a second fixing unit disposed on a rear surface of the receiving unit; and
   a transmitting unit configured to change a transmission path of data in response to a user's request,
   wherein the receiving unit operates as a second transmitting/receiving unit configured to wirelessly transmit the data outputted from the transmitting unit.

2. The portable electronic device according to claim 1, wherein the portable electronic device is packaged by a housing,
   the receiving unit is formed on one rear surface of the housing, and
   the second fixing unit is formed on the rear surface of the receiving unit.

3. The portable electronic device according to claim 1, wherein the second fixing unit is selected from a permanent magnet and a steel plate.

4. The portable electronic device according to claim 1, wherein the receiving unit comprises a secondary coil.

5. The portable electronic device according to claim 1, wherein the transmitting unit comprises:
   a switching unit configured to change an output path of the data; and
   a modulation unit configured to modulate the data transmitted through the switching unit and transmit the modulated data to the second transmitting/receiving unit.

6. The portable electronic device according to claim 1, wherein the data comprises multimedia data or video data.

7. The portable electronic device according to claim 1, wherein the receiving unit comprises a secondary coil.

8. A wireless charging system comprising:
   a wirelessly charging device configured to generate magnetic energy and a designated magnitude or more of attractive force; and
   a portable electronic device attached to the wireless charging device through an attractive force and charged with power through the magnetic energy provided from the wireless charging device,
   wherein the portable electronic device comprises:
   a transmitting unit configured to change a transmission path of data in response to a user's request;
   a battery cell;
   a second transmitting/receiving unit configured to receive the magnetic energy, provide the received magnetic energy to the battery cell, and wirelessly transmit the data provided from the transmitting unit; and
   a second fixing unit disposed on a rear surface of the second transmitting/receiving unit.

9. The wireless charging system according to claim 8, wherein the wireless charging device comprises:
- a transmitting unit configured to receive a high-frequency AC current and generate the magnetic energy; and
- a first fixing unit disposed on a rear surface of the transmitting unit and configured to generate the designated magnitude or more of attractive force.

10. The wireless charging system according to claim 9, wherein the first fixing unit is selected from a permanent magnet and an electromagnet.

11. The wireless charging system according to claim 9, wherein the transmitting unit comprises a primary coil.

12. The wireless charging system according to claim 8, wherein the portable electronic device comprises:
- a battery cell;
- a receiving unit configured to receive the magnetic energy and provide the received magnetic energy to the battery cell; and
- a second fixing unit disposed on a rear surface of the receiving unit.

13. The wireless charging system according to claim 12, wherein the second fixing unit is selected from a permanent magnet and a steel plate.

14. The wireless charging system according to claim 12, wherein the receiving unit comprises a secondary coil.

15. The wireless charging system according to claim 8, wherein the portable electronic device wirelessly transmits the data, and the wireless charging device wirelessly receives the data and processes the received data.

16. The wireless charging system according to claim 15, wherein the wireless charging device comprises:
- a first transmitting/receiving unit configured to receive a high-frequency AC current to generate the magnetic energy, and wirelessly receive the data;
- a first fixing unit disposed on a rear surface of the first transmitting/receiving unit and configured to generate the designated magnitude or more of attractive force; and
- a data processing unit configured to process the data received through the first transmitting/receiving unit.

17. The wireless charging system according to claim 16, wherein the data processing unit serves as a reproducing unit configured to output the data received through the first transmitting/receiving unit.

18. The wireless charging system according to claim 16, wherein the data processing unit serves as a backup unit configured to store the data received through the first transmitting/receiving unit.

19. The wireless charging system according to claim 16, wherein the first transmitting/receiving unit comprises a primary coil.

20. The wireless charging system according to claim 8, wherein the transmitting unit comprises:
- a switching unit configured to change an output path of the data; and
- a modulation unit configured to modulate the data transmitted through the switching unit and provide the modulated data to the second transmitting/receiving unit.

21. The wireless charging system according to claim 8, wherein the second transmitting/receiving unit comprises a secondary coil.

22. The wireless charging system according to claim 8, wherein the data comprises multimedia data or video data.

* * * * *